United States Patent
Lodha et al.

(10) Patent No.: US 7,352,761 B2
(45) Date of Patent: Apr. 1, 2008

(54) DISTRIBUTING UNUSED ALLOCATED BANDWIDTH USING A BORROW VECTOR

(75) Inventors: Sandeep Lodha, Sunnyvale, CA (US); Deepak Aatresh, Cupertino, CA (US); Rajesh Narayanan, Milpitas, CA (US); Raymond Vaughan-Williams, Santa Clara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1039 days.

(21) Appl. No.: 10/370,669

(22) Filed: Feb. 18, 2003

(65) Prior Publication Data

US 2003/0223430 A1     Dec. 4, 2003

Related U.S. Application Data

(60) Provisional application No. 60/385,982, filed on Jun. 4, 2002.

(51) Int. Cl.
*H04L 12/28*     (2006.01)
*H04J 3/16*      (2006.01)

(52) U.S. Cl. .................... 370/412; 370/465
(58) Field of Classification Search ............ None
See application file for complete search history.

(56) References Cited

U.S. PATENT DOCUMENTS

| | | | |
|---|---|---|---|
| 5,982,771 A | 11/1999 | Caldara et al. | |
| 5,996,019 A | 11/1999 | Hauser et al. | |
| 6,408,005 B1 | 6/2002 | Fan et al. | |
| 6,452,933 B1* | 9/2002 | Duffield et al. | 370/415 |
| 6,470,016 B1* | 10/2002 | Kalkunte et al. | 370/395.41 |
| 6,501,762 B1* | 12/2002 | Pillar et al. | 370/412 |
| 6,519,595 B1* | 2/2003 | Rose | 707/10 |
| 6,683,884 B1* | 1/2004 | Howard | 370/412 |
| 6,798,741 B2* | 9/2004 | Lodha et al. | 370/229 |
| 6,822,966 B2* | 11/2004 | Putcha et al. | 370/411 |
| 6,947,998 B2* | 9/2005 | Mekkittikul et al. | 709/241 |
| 6,986,137 B1* | 1/2006 | King et al. | 718/104 |
| 7,065,762 B1* | 6/2006 | Duda et al. | 718/102 |
| 7,072,971 B2* | 7/2006 | Lassen et al. | 709/230 |
| 7,110,411 B2* | 9/2006 | Saidi et al. | 370/395.4 |
| 2003/0031178 A1* | 2/2003 | Haeri et al. | 370/392 |

FOREIGN PATENT DOCUMENTS

WO      WO 02/21773 A2      3/2002

* cited by examiner

*Primary Examiner*—Andrew C. Lee

(57) ABSTRACT

A packet-based traffic forwarding system with a plurality of contending queues. Each queue has an allocated bandwidth and an associated borrow vector. When a first queue does not consume all of its allocated bandwidth, the borrow vector associated with a second queue is checked to determine whether the second queue is permitted to use the unconsumed allocated bandwidth of the first queue. If the second queue has packets to forward, the second queue forwards the packets using the unconsumed allocated bandwidth of the first queue.

17 Claims, 5 Drawing Sheets

| Queue | A1 | A2 | A3 | A4 |
|---|---|---|---|---|
| Allocated Bandwidth (%) | 5 | 10 | 20 | 65 |
| Borrow Vector | [ 0  0  0 ] | [ 1  0  0 ] | [ 1  1  0 ] | [ 1  1  1 ] |
| Resulting Maximum Bandwidth (%) | 5 | 15 | 35 | 100 |
| Queue | B1 | B2 | B3 | B4 |
| Allocated Bandwidth (%) | 5 | 10 | 20 | 65 |
| Borrow Vector | [ 1  1  1 ] | [ 1  1  1 ] | [ 1  1  1 ] | [ 1  1  1 ] |
| Resulting Maximum Bandwidth (%) | 100 | 100 | 100 | 100 |
| Queue | C1 | C2 | C3 | C4 |
| Allocated Bandwidth (%) | 10 | 20 | 30 | 40 |
| Borrow Vector | [ 0  0  0 ] | [ 1  0  0 ] | [ 0  1  0 ] | [ 0  1  1 ] |
| Resulting Maximum Bandwidth (%) | 10 | 30 | 50 | 90 |

DISTRIBUTING UNUSED ALLOCATED BANDWIDTH USING A BORROW VECTOR

CROSS REFERENCE TO RELATED APPLICATION

This application is entitled to the benefit of provisional Patent Application Ser. No. 60/385,982, filed Jun. 4, 2002.

BACKGROUND OF THE INVENTION

Weighted Fair Queuing (WFQ) and credit token schemes are two ways to schedule packets out of a multi-queue system. With a WFQ scheme, each queue gets a transmission window and may forward packets only during its transmission window. The size of the transmission window given to each queue corresponds to the amount of bandwidth that has been allocated to the respective queues. With a credit token scheme, each queue gets tokens and may forward packets so long as the respective queue has tokens. The amount of tokens given to each queue corresponds to the amount of bandwidth that has been allocated to the respective queues.

With a WFQ scheme, time slots are allocated to each queue. The size of the time slots may be different. The bandwidth allocated to each queue can be weighted by setting the time slots to different sizes. An idle time slot allocation may be used to control the total bandwidth utilized.

With a credit token scheme, tokens are replenished for each queue at the start of a time period. The queues may forward packets as long as they have tokens. When more than one queue has tokens, packets from the queue with the highest priority are typically forwarded first. The length of the time periods between token replenishment may be adjusted to control the profile of bandwidth utilization.

With both the WFQ and credit token schemes, during a given time period a queue may not use all of its allocated bandwidth. Accordingly, it would be desirable to identify which queues can borrow unused allocated bandwidth from a queue that does not utilize its allocated share, such as when the queue has no more packets. It would also be desirable to determine at what rate those queues are entitled to forward packets.

In view of the desire to borrow unused allocated bandwidth from a queue that does not utilize its allocated share of bandwidth, what is needed is a new unused bandwidth allocation scheme that allows determination of which queues can borrow unused allocated bandwidth. In addition, it would be advantageous to establish a rate at which those queues are entitled to forward packets.

SUMMARY OF THE INVENTION

A technique for allocating bandwidth between a plurality of queues includes allocating bandwidth between queues and setting a borrow vector for one of the queues that indicates a subset of queues from which borrowing unused allocated bandwidth is permitted. This technique enables the sharing of unused bandwidth according to an allocation scheme that allows determination of which queues can borrow the unused bandwidth. The technique can be easily implemented in hardware.

In an embodiment, a method for forwarding packet-based traffic from a plurality of contending queues to an output having a finite bandwidth includes consuming a portion of bandwidth of an output with packets from queues according to respective bandwidths allocated to the queues, leaving unused allocated bandwidth of a first queue when the first queue does not exhaust the bandwidth that is allocated to the first queue and allowing a second queue to forward packets using the unused allocated bandwidth if a borrow vector associated with the second queue indicates that the second queue is permitted to use bandwidth allocated to the first queue.

In another embodiment, a system for forwarding packet-based traffic from a plurality of contending queues to an output having a finite bandwidth includes queues for forwarding packets, wherein a first queue of the queues has a first allocated bandwidth, a borrow vector, associated with a second queue, configured to indicate a subset of the queues from which the second queue is permitted to borrow unused allocated bandwidth, a scheduler for forwarding packets from the second queue using a portion of the first allocated bandwidth when the first queue does not consume all of the first allocated bandwidth, if the borrow vector associated with the second queue indicates that the second queue is permitted to borrow unused allocated bandwidth from the first queue.

Other aspects and advantages will become apparent from the following detailed description, taken in conjunction with the accompanying drawings, illustrating by way of example the principles of the invention.

DETAILED DESCRIPTION OF THE INVENTION

Figure 1:
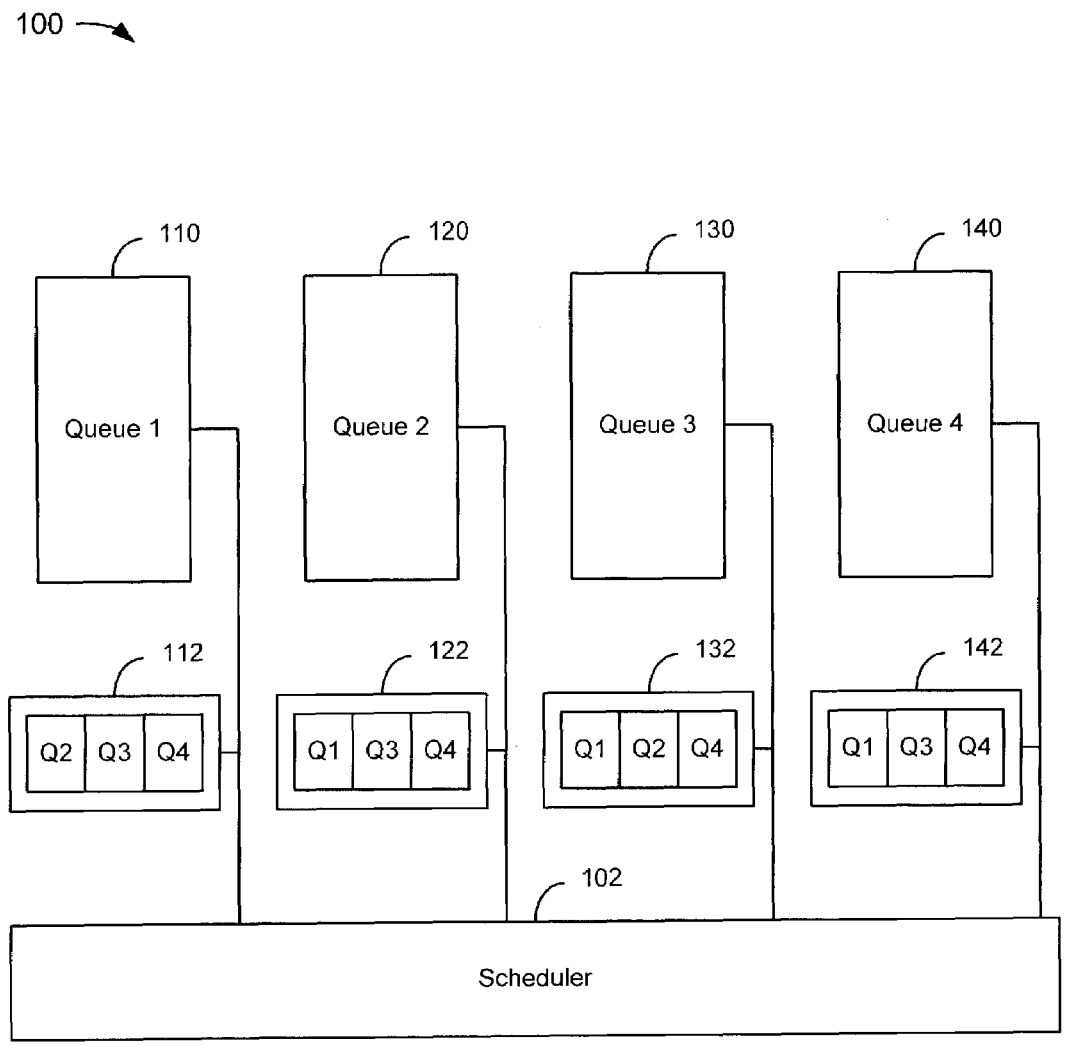
FIG. 1 is a block diagram of a system for distributing unused allocated bandwidth in accordance with an embodiment of the invention.

As shown in the drawings for the purposes of illustration, an embodiment of the invention is a traffic forwarding system configured for use in a network with packet-based traffic. The system includes a scheduler and a plurality of queues with associated borrow vectors. In an embodiment, a scheduling algorithm identifies the queue from which packets should be forwarded. If the identified queue has consumed its allocated bandwidth, then the scheduling algorithm (or some other scheduling algorithm) identifies at least one other queue (a borrowing queue) to consume the unused allocated bandwidth. The borrow vector of the borrowing queue is checked to determine if the borrowing queue is permitted to consume the unused allocated bandwidth.

FIG. 1 is a block diagram of a system 100 for distributing unused allocated bandwidth in accordance with an embodiment of the invention. System 100 includes a scheduler 102, four queues 110, 120, 130, and 140, and four registers 112, 122, 132, and 142 respectively associated with the four queues. The queues 110, 120, 130, and 140 are preferably first-in-first-out (FIFO) queues that identify packets for forwarding. When packets are forwarded, bandwidth is consumed. The amount of bandwidth a queue may consume depends upon the share of bandwidth allocated to the queue.

In the embodiment of FIG. 1, the registers 112, 122, 132, and 142 contain borrow vectors that indicate from which queues, if any, borrowing is permitted. In an embodiment, the registers 112, 122, 132, and 142 are n−1 bit registers where n is the number of queues. Since n=4 in this embodiment, the registers 112, 122, 132, and 142 are preferably 3-bit registers. Each bit of the registers corresponds to one of the queues other than the queue with which the register is associated. For example, the register 112, which is associated with the queue 110, includes a first bit that corresponds to the queue 120, a second bit that corresponds to the queue 130, and a third bit that corresponds to the queue 140. These bits are referred to herein collectively as the borrow vector.

The scheduler 102 preferably runs a first scheduling algorithm that identifies a first queue that is allowed to forward packets. If the first queue consumes all of its allocated bandwidth, then the first scheduling also is used to identify another queue that is permitted to forward packets. If the first queue does not consume its allocated bandwidth, the scheduler 102 is preferably configured to run a second scheduling algorithm for identifying at least one second queue that is permitted to consume the unused allocated bandwidth of the first queue. The scheduler 102 uses the appropriate borrow vectors to identify the second queue in a manner that is described below with reference to FIGS. 2 and 3.

Figure 2:
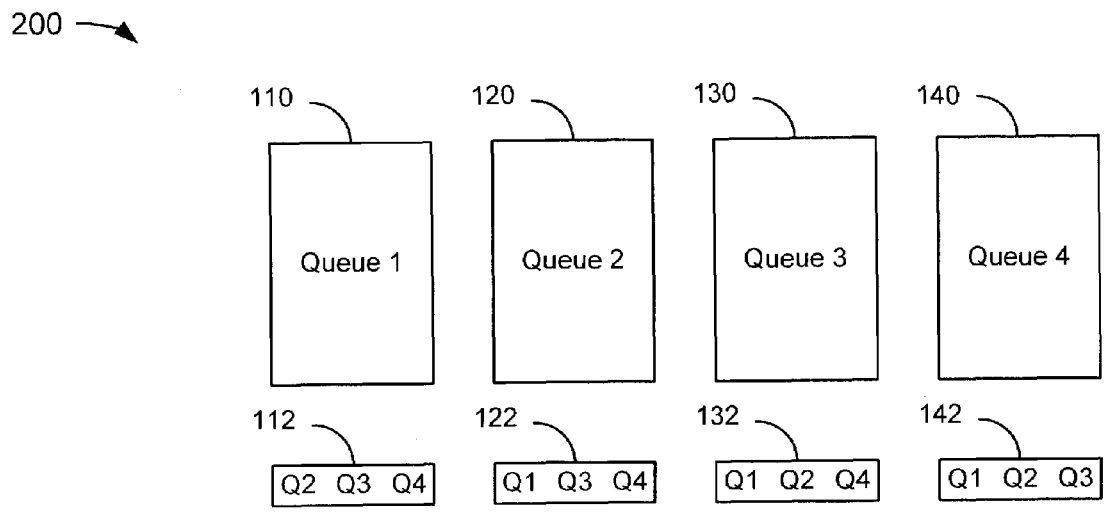
FIG. 2 depicts exemplary bandwidth allocations and borrow vector configurations in accordance with an embodiment of the invention.

FIG. 2 depicts exemplary bandwidth allocations and borrow vector configurations in accordance with an embodiment of the invention. FIG. 2 serves to illustrate the maximum per queue bandwidths that result from allocating bandwidth to the queues 110, 120, 130, and 140 (FIG. 1) and setting the borrow vectors of registers 112, 122, 132, and 142 (FIG. 1), respectively. FIG. 2 includes three example bandwidth allocations and borrow vector configurations, wherein the queues are represented as A1 . . . A4, B1 . . . B4, and C1 . . . C4 for examples A, B, and C, respectively. For illustrative purposes, each queue includes an allocated bandwidth, a borrow vector (represented in square brackets), and a resulting maximum bandwidth. In the embodiment of FIG. 2, the allocated bandwidth and resulting maximum bandwidth are represented as a percentage of the total available bandwidth. The calculation of the resulting maximum bandwidth is explained below.

In the first example (example A) of FIG. 2, queue A1 has an allocated bandwidth of 5% and an associated borrow vector of [0 0 0]. Since the borrow vector contains only 0's, A1 may not borrow unused allocated bandwidth from any of the other queues A2, A3, or A4. Since A1 may not borrow unused allocated bandwidth from any of the other queues, the resulting maximum bandwidth of A1 is the same as the allocated bandwidth of A1, which is 5%. A2, on the other hand, has an allocated bandwidth of 10% and an associated borrow vector of [1 0 0]. The associated borrow vector value of 1 in the first position indicates A2 may borrow unused allocated bandwidth from A1 and the values of 0 in the second and third positions indicated that A2 may not borrow unused allocated bandwidth from A3 or A4. Accordingly, the resulting maximum bandwidth for A2 is higher than the allocated bandwidth for A2. If A1 does not consume any of its allocated bandwidth, then A2 may be permitted to borrow all of A1's bandwidth. If A1 consumes part of its allocated bandwidth, A2 may be permitted to borrow some of the remaining unused bandwidth. Since A1 has 5% allocated bandwidth and A2 has 10% allocated bandwidth, the resulting maximum bandwidth for A2 is 5%+10%=15%. Whether A2 is actually permitted to borrow unused allocated bandwidth from A1 depends on whether A1 consumes all of its allocated bandwidth and on the results of a scheduling algorithm, as explained below. A3 has an allocated bandwidth of 20% and an associated borrow vector of [1 1 0]. The borrow vector indicates A3 may borrow unused allocated bandwidth from both A1 and A2. Since A1 has 5% allocated bandwidth, A2 has 10% allocated bandwidth, and A3 has 20% allocated bandwidth, the resulting maximum bandwidth for A3 is 5%+10%+20%=35%. A3 would be able to achieve this resulting maximum bandwidth if A1 and A2 did not consume any of their allocated bandwidth and no other queue uses this unconsumed bandwidth of A1 and A2. A4 has an allocated bandwidth of 65% and an associated borrow vector of [1 1 1]. The borrow vector indicates A4 may borrow unused allocated bandwidth from any of the other queues A1, A2, and A3. Accordingly, the resulting maximum bandwidth for A4 is the sum of allocated bandwidths of all of the queues, which is 100% of the allocated bandwidth in this example.

In the second example (example B) of FIG. 2, queues B1, B2, B3, and B4 have the same allocated bandwidth as A1, A2, A3, and A4, respectively, but the associated borrow vectors of B1, B2, B3, and B4 are each [1 1 1]. Accordingly, the resulting maximum bandwidth for each B1, B2, B3, and B4 is the sum of all of their respective allocated bandwidths, which is 100% in this example.

In the third example (example C) of FIG. 2, queues C1, C2, C3, and C4 have respective allocated bandwidths of 10%, 20%, 30%, and 40%. C1 has an associated borrow vector of [0 0 0], which means the resulting maximum bandwidth of C1 is the same as its allocated bandwidth, which is 10%. C2 has an associated borrow vector of [1 0 0], which means the resulting maximum bandwidth of C2 equals the allocated bandwidths of both C1 and C2, which is 10%+20%=30%. C3 has an associated borrow vector of [0 1 0], which means the resulting maximum bandwidth of C3 equals the allocated bandwidths of both C2 and C3, which is 20%+30%=50%. C4 has an associated borrow vector of [0 1 1], which means the resulting maximum bandwidth of C4 equals the allocated bandwidths of C2, C3, and C4, which is 20%+30%+40%=90%.

Thus, a resulting maximum bandwidth is determined by setting the allocated bandwidth and borrow vector of each queue. Moreover, rate shaping is possible by selecting borrow vector values for a given queue based on the allocated bandwidths of the other queues.

Figure 3:
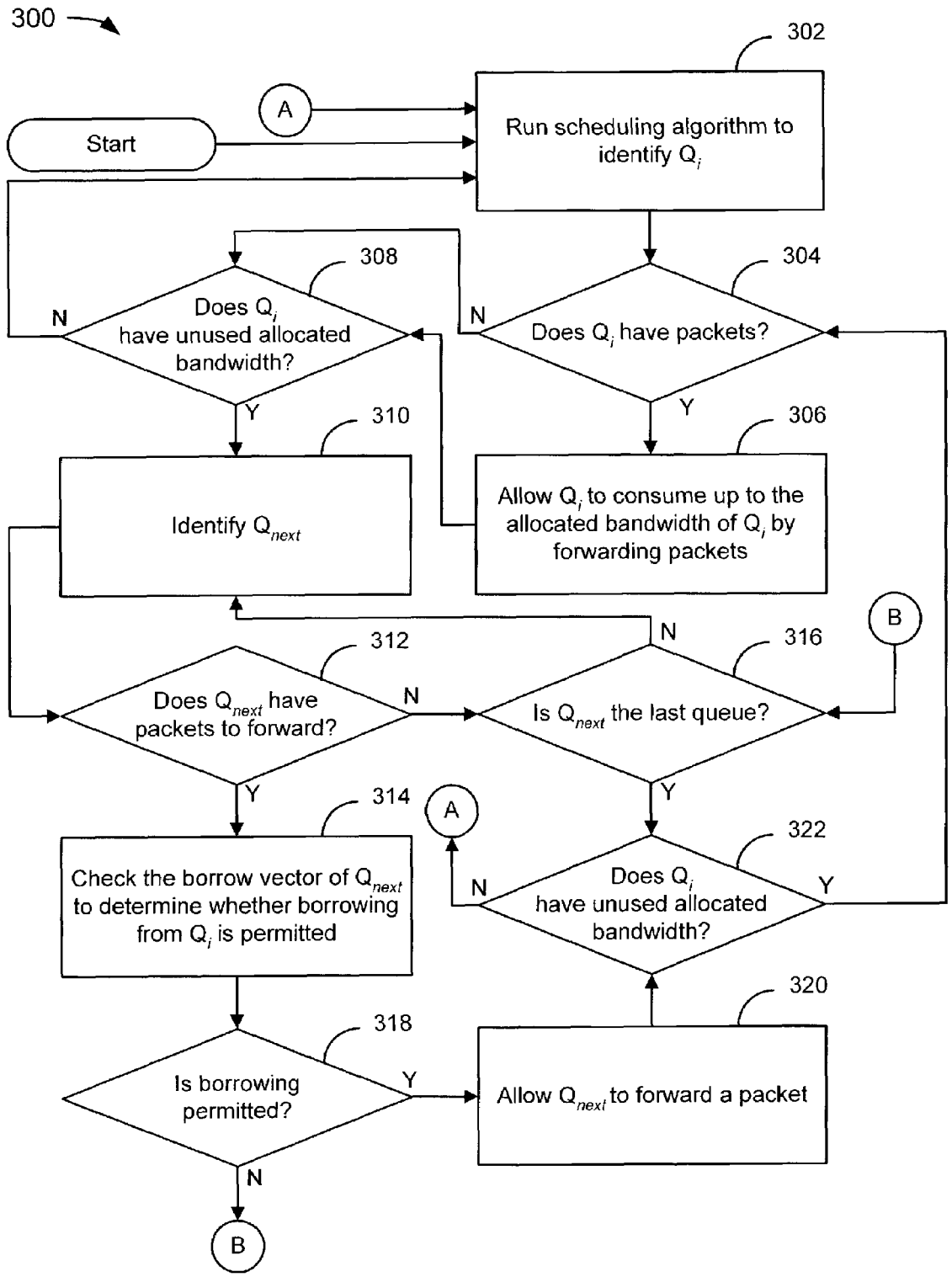
FIG. 3 is a flowchart of a method for distributing unused allocated bandwidth in accordance with an embodiment of the invention, to be implemented by the system of FIG. 1.

FIG. 3 is a flowchart 300 of a method for distributing unused allocated bandwidth in accordance with an embodiment of the invention. FIG. 3 serves to illustrate the steps that are taken for one or more queues to borrow unused allocated bandwidth from a first queue. In an embodiment, a scheduling algorithm first identifies the queue from which packets should be forwarded. If the identified queue has consumed its allocated bandwidth, then the scheduling algorithm (or a second scheduling algorithm) identifies at least one other queue (a borrowing queue) to consume the unused allocated bandwidth. The borrow vector of the borrowing queue is checked to determine if the borrowing queue is permitted to consume the unused allocated bandwidth. It should be noted that prior to the start of the flowchart 300, the queues have been allocated bandwidth and the borrow vectors associated with each queue have been set.

The flowchart 300 starts with a scheduling algorithm running to identify a queue, $Q_i$, that is allowed to forward packets at step 302. The identification of $Q_i$ may be by round robin selection, strict priority (where each of the queues have a relative priority), or some other scheme. At decision point 304, it is determined whether $Q_i$ has packets. If so, $Q_i$ is allowed to consume up to the allocated bandwidth of $Q_i$ by forwarding packets at step 306 and the flowchart 300 continues to decision point 308. If not, at decision point 308, it is determined whether $Q_i$ has unused allocated bandwidth. At decision point 308, if $Q_i$ does not have unused allocate bandwidth, the scheduling algorithm is run to identify a new $Q_i$. If $Q_i$ does have unused allocated bandwidth (308-Y), then at step 310 a next queue, $Q_{next}$, is identified. The technique used to identify $Q_{next}$ may be by round robin, strict priority, using information associated with $Q_i$, or some other scheme. At decision point 312, a determination is made as to whether $Q_{next}$ has packets to forward. If $Q_{next}$ has packets to forward, then at step 314 the borrow vector of $Q_{next}$ is checked to determine whether borrowing unused allocated bandwidth from $Q_i$ is permitted. If $Q_{next}$ does not have packets to forward (312-N), then at decision point 316 it is determined whether $Q_{next}$ is the last queue. If $Q_{next}$ is the last queue, then any new $Q_{next}$ that would be identified at step 310 would have been previously identified and given the opportunity to consume the unused allocated bandwidth of $Q_i$. Accordingly, at step 322 it is determined whether $Q_i$ has unused allocated bandwidth. If not, the scheduling algorithm is run to identify a new $Q_i$ at step 302 and the flowchart 300 continues as described previously. Otherwise, if $Q_i$ has unused allocated bandwidth, at decision point 304, a determination is made as to whether $Q_i$ has packets and the flowchart 300 continues as described previously. If $Q_{next}$ is not the last queue, then a new $Q_{next}$ is identified at step 310. At decision point 318, a determination is made as to whether $Q_{next}$ is permitted to borrow the unused allocated bandwidth of $Q_i$. If borrowing is not permitted, then at step 316 it is determined whether $Q_{next}$ is the last queue and the flowchart 300 continues as described previously. Otherwise, if borrowing is permitted, then at step 320 $Q_{next}$ is allowed to forward a packet. At decision point 322, a determination is made as to whether $Q_{next}$ has consumed all of the unused allocated bandwidth and the flowchart 300 continues as described previously.

Figure 4A:
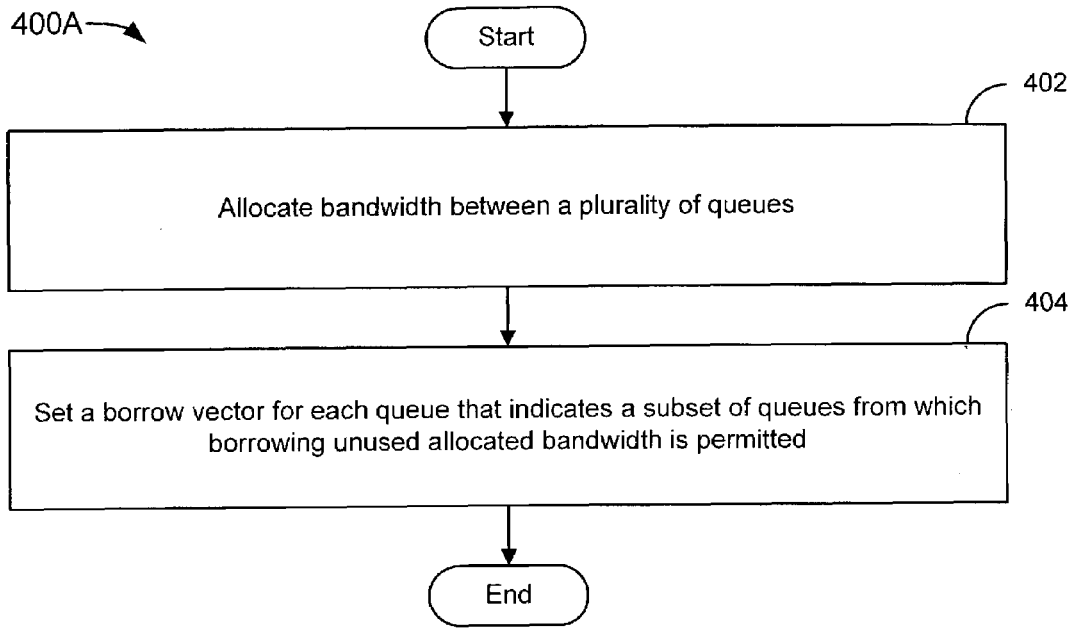
FIGS. 4A and 4B depict flowcharts of methods for distributing unused allocated bandwidth in accordance with embodiments of the invention.
Figure 4B:
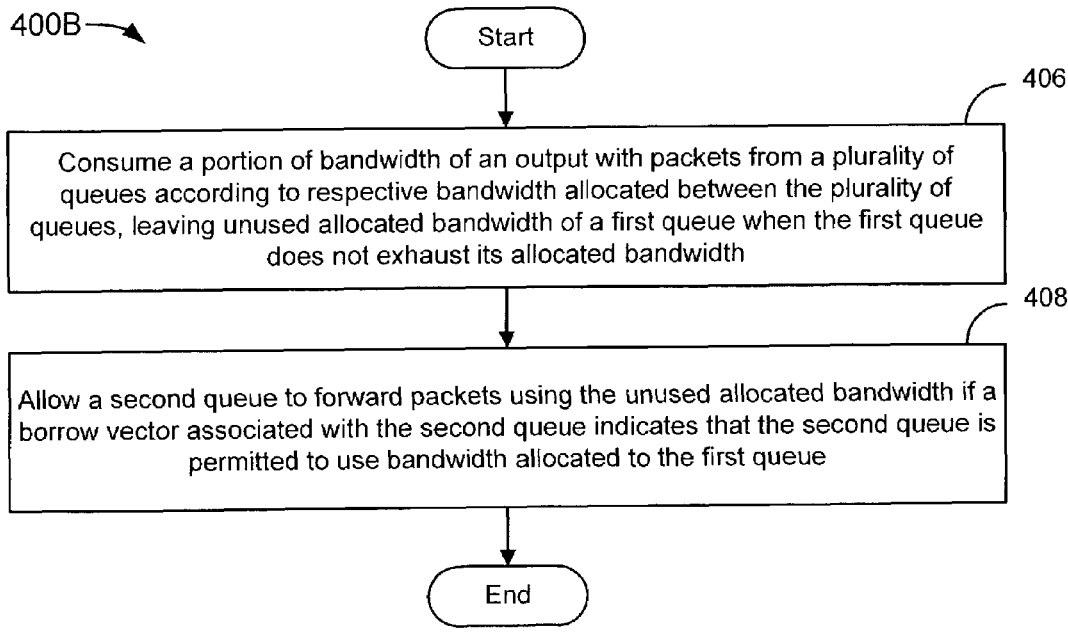

FIG. 4 depicts a flowchart 400A and a flowchart 400B of methods for distributing unused allocated bandwidth in accordance with embodiments of the invention. The flowchart 400A starts at step 402 with allocating bandwidth between a plurality of queues. This allocation may be accomplished using weighted fair queuing (WFQ), credit token, or some other method of allocating bandwidth between contending queues. This allocation may also include designating some bandwidth as idle, which has the effect of limiting the amount of bandwidth allocated to the queues to some amount of available bandwidth that is less than the total amount of bandwidth that could be utilized for an output. The flowchart 400A continues at step 404 with setting a borrow vector for a queue of the plurality of queues that indicates a subset of the plurality of queues from which borrowing unused allocated bandwidth is permitted. The subset could include every queue of the plurality of queues or no queue of the plurality of queues (e.g., the subset could be an empty set). Some examples of borrow vectors are illustrated in FIG. 2 for a system with four queues.

The flowchart 400B starts at step 406 with consuming a portion of bandwidth of an output with packets from a plurality of queues according to respective bandwidths allocated to the queues, leaving unused allocated bandwidth of a first queue when the first queue does not exhaust its allocated bandwidth. A determination as to whether the first queue has consumed substantially all of its allocated bandwidth may be made. The flowchart 400B continues at step 408 with allowing a second queue to forward packets using the unused allocated bandwidth if a borrow vector associated with the second queue indicates that the second queue is permitted to use bandwidth allocated to the first queue. The second queue may be identified using a scheduling algorithm. Preferably, the borrow vector indicates whether the second queue is permitted to use bandwidth allocated to each of the plurality of queues other than the second queue. By checking the position of the borrow vector that corresponds to the first queue, it may be determined that the second queue is permitted to use unused allocated bandwidth. In some cases, the second queue does not use up the unused allocated bandwidth. Accordingly, a scheduling algorithm may identify a third queue and let the third queue forward packets using the unused allocated bandwidth if the borrow vector associated with the third queue indicates the third queue is permitted to borrow from the first queue.

Figure 5:
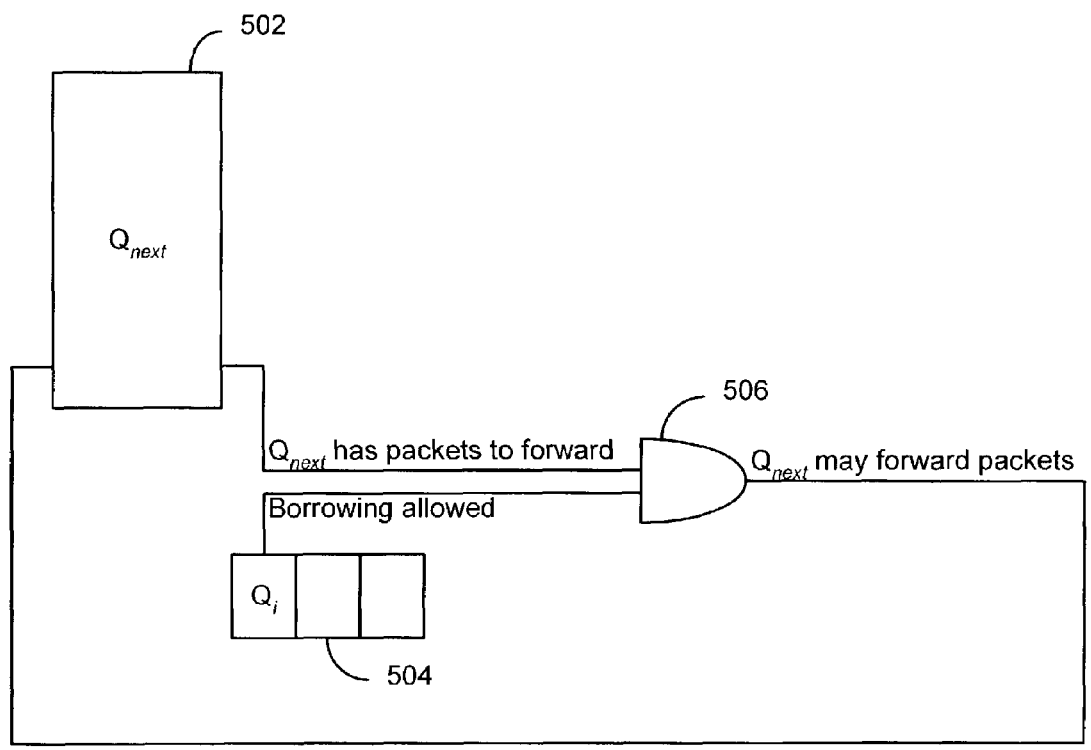
FIG. 5 is a block diagram of a subsystem for distributing unused allocated bandwidth in accordance with an embodiment of the invention.

FIG. 5 is a block diagram of a system 500 for distributing unused allocated bandwidth in accordance with an embodiment of the invention. System 500 includes a queue 502, a borrow vector 504, and an AND gate 506. A "$Q_{next}$ has packets to forward" flag is an output of the queue 502. When it has been determined that $Q_i$ has not used all of its allocated bandwidth and unused bandwidth is therefore available, and queue 502 has been selected as the queue that may forward packets using the unused allocated bandwidth, such as by using the methods described above, the AND gate 506 ANDs the "$Q_{next}$ has packets to forward" flag and the bit associated with $Q_i$. The output of the AND gate is a "$Q_{next}$ may forward packets" flag, which enables $Q_{next}$. In an embodiment, $Q_{next}$ has packets to forward means $Q_{next}$ is not empty.

Allocated bandwidth is expressed herein as a percentage of the total available bandwidth, but it could be expressed in some other terms. In addition, allocating the bandwidth in the designated percentages could be accomplished with, for example, WFQ, credit bucket, token bucket, or any other bandwidth allocation technique.

In one embodiment, the method steps described above are embodied in a computer-readable media as computer instruction code. It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method of allocating bandwidth between a plurality of queues, comprising:

allocating bandwidth between a plurality of queues;

setting a borrow vector for a queue of said plurality of queues that indicates a subset of said plurality of queues from which said queue is permitted to borrow unused allocated bandwidth;

consuming bandwidth according to said allocated bandwidth; and allowing unused allocated bandwidth of a first queue to be used by a second queue if a borrow vector of said second queue indicates that borrowing from said first queue is permitted, wherein the allowing unused allocated bandwidth to be used comprises utilizing an AND gate to enable said second queue when said second queue is not empty and said borrow vector indicates said second queue may borrow unused allocated bandwidth from said first queue.

2. The method of claim 1, further comprising:
running a scheduling algorithm to identify a queue, $Q_i$;
allowing $Q_i$, to consume up to the allocated bandwidth of $Q_i$;
determining whether $Q_i$ has unused allocated bandwidth;
identifying a next queue, $Q_{next}$, and
checking a borrow vector associated with $Q_{next}$ to determine whether $Q_{next}$ is permitted to borrow unused allocated bandwidth from $Q_i$.

3. The method of claim 2, further comprising:
consuming said unused allocated bandwidth if $Q_{next}$ is permitted to borrow unused allocated bandwidth from $Q_i$.

4. The method of claim 1, wherein said borrow vector indicates whether a queue, $Q_{next}$, of said plurality of queues is permitted to borrow unused bandwidth from said plurality of queues other than Qnext.

5. A method for forwarding packet-based traffic from a plurality of contending queues to an output having a finite bandwidth, comprising:
consuming a portion of bandwidth of an output with packets from a plurality of queues according to respective bandwidths allocated to said plurality of queues, leaving unused allocated bandwidth of a first queue of said plurality of queues when said first queue does not exhaust the bandwidth that is allocated to said first queue; and
allowing a second queue to forward packets using said unused allocated bandwidth if a borrow vector associated with said second queue indicates that said second queue is permitted to use bandwidth allocated to said first queue, wherein said borrow vector indicates a subset of said plurality of queues from which said second queue is permitted to borrow unused allocated bandwidth and wherein said borrow vector does not indicate whether queues in said plurality of queues have packets to forward.

6. The method of claim 5, wherein said borrow vector indicates whether said second queue is permitted to borrow unused bandwidth from said plurality of queues other than said second queue.

7. The method of claim 5, further comprising:
determining that said first queue has unused allocated bandwidth.

8. The method of claim 5, further comprising:
determining from said borrow vector that said second queue is permitted to use said unused allocated bandwidth; and
determining that said second queue has packets to forward.

9. The method of claim 5, further comprising:
identifying said second queue using a routine for identifying a next queue.

10. The method of claim 9, further comprising:
identifying a third queue using said routine for identifying a next queue; and
allowing said third queue to forward packets using a portion of said unused allocated bandwidth if a borrow vector associated with said third queue indicates said third queue is permitted to borrow from said first queue and said second queue consumes less than said unused allocated bandwidth, leaving said portion.

11. A system for forwarding packet-based traffic from a plurality of contending queues to an output having a finite bandwidth, comprising:
a plurality of queues for forwarding packets, wherein a first queue of said plurality of queues has a first allocated bandwidth;
a borrow vector, associated with a second queue, configured to indicate a subset of said plurality of queues from which said second queue is permitted to borrow unused allocated bandwidth;
a scheduler for forwarding packets from said second queue using a portion of said first allocated bandwidth when said first queue does not consume all of said first allocated bandwidth, if said borrow vector associated with said second queue indicates that said second queue is permitted to borrow unused allocated bandwidth from said first queue; and
an AND gate for enabling said second queue when said second queue is not empty and said borrow vector indicates said second queue may borrow unused allocated bandwidth from said first queue.

12. The system of claim 11, wherein said borrow vector indicates whether said second queue is permitted to use bandwidth allocated to each of said plurality of queues other than said second queue.

13. The system of claim 11, further comprising:
a plurality of borrow vectors respectively associated with each of said plurality of queues other than said second queue.

14. The system of claim 11, further comprising:
a register configured to contain said borrow vector, wherein said borrow vector includes an array of bits, and wherein each bit of said array of bits corresponds to a queue of said subset.

15. The system of claim 11, wherein said scheduler allows packets to be forwarded according to a scheduling algorithm.

16. The system of claim 11, wherein said scheduler allows packets to be forwarded according to allocated bandwidth.

17. The system of claim 11, wherein said scheduler implements a first scheduling algorithm for identifying the queues from which packet forwarding is allowed and a second scheduling algorithm for identifying a next queue that is permitted to used unused allocated bandwidth.

* * * * *